(12) United States Patent
Bojiuc

(10) Patent No.: US 8,074,579 B1
(45) Date of Patent: Dec. 13, 2011

(54) MAGNETICALLY LEVITATED TRANSPORT SYSTEM

(76) Inventor: Dumitru Bojiuc, Marina Del Rey, CA (US)

( * ) Notice: Subject to any disclaimer, the term of this patent is extended or adjusted under 35 U.S.C. 154(b) by 53 days.

(21) Appl. No.: 12/784,900

(22) Filed: May 21, 2010

Related U.S. Application Data

(63) Continuation-in-part of application No. 11/209,916, filed on Aug. 22, 2005, now abandoned.

(51) Int. Cl.
 B60L 13/04 (2006.01)
 H02K 41/02 (2006.01)
(52) U.S. Cl. .................. 104/281; 310/12.09; 318/135
(58) Field of Classification Search .............. 310/12.01, 310/12.09, 12.04; 104/281–283, 286, 290, 104/292; 318/135
 See application file for complete search history.

(56) References Cited

U.S. PATENT DOCUMENTS

| | | | |
|---|---|---|---|
| 3,820,471 A * | 6/1974 | Maki ............................. | 104/282 |
| 4,276,832 A * | 7/1981 | Sika et al. ..................... | 104/292 |
| 4,459,501 A | 7/1984 | Fawzy | |
| 4,565,938 A | 1/1986 | Fawzy | |
| 4,623,809 A | 11/1986 | Westley | |
| 4,646,651 A * | 3/1987 | Yamamura et al. ........... | 104/281 |
| 4,913,059 A * | 4/1990 | Fujie et al. .................... | 104/282 |
| 5,085,149 A * | 2/1992 | Huson ........................... | 104/281 |
| 5,191,255 A | 3/1993 | Kloosterhouse et al. | |
| 5,275,112 A * | 1/1994 | Rote et al. ..................... | 104/282 |
| 5,337,030 A | 8/1994 | Mohler | |
| 5,511,488 A * | 4/1996 | Powell et al. ................. | 104/282 |
| 5,651,318 A * | 7/1997 | O'Donohue .................. | 104/124 |
| 5,657,697 A * | 8/1997 | Murai ........................... | 104/284 |
| 6,091,215 A * | 7/2000 | Lovett et al. .................. | 318/114 |
| 6,507,257 B2 | 1/2003 | Mohler | |
| 6,803,691 B2 | 10/2004 | Rose | |
| 6,864,602 B2 * | 3/2005 | Korenaga ................... | 310/12.24 |
| 2002/0135263 A1 | 9/2002 | Neal | |
| 2004/0135452 A1 | 7/2004 | Tu et al. | |

* cited by examiner

*Primary Examiner* — Burton Mullins
(74) *Attorney, Agent, or Firm* — Gene Scott; Patent Law & Venture Group

(57) ABSTRACT

A magnetically levitated transport system moves a suspended cargo such as passengers and freight. A linear motor uses a track stator about which a "rotor" moves linearly. Stator and rotor circuits interact electromagnetically to maintain a gap between the moving and fixed elements. Tractor coils are embedded within the track to produce thrust through electromotor action with magnets aboard the rotor. The rotor is configured in a triangular shape as is the track with opposing electromagnets positioned for creating mutual repulsion forces. A pulsed direct current in the stator circuit, derived from conventional alternating current taken from the power grid, is used to create an induced current in the rotor, which, in turn is used to energize rotor electromagnets.

11 Claims, 10 Drawing Sheets

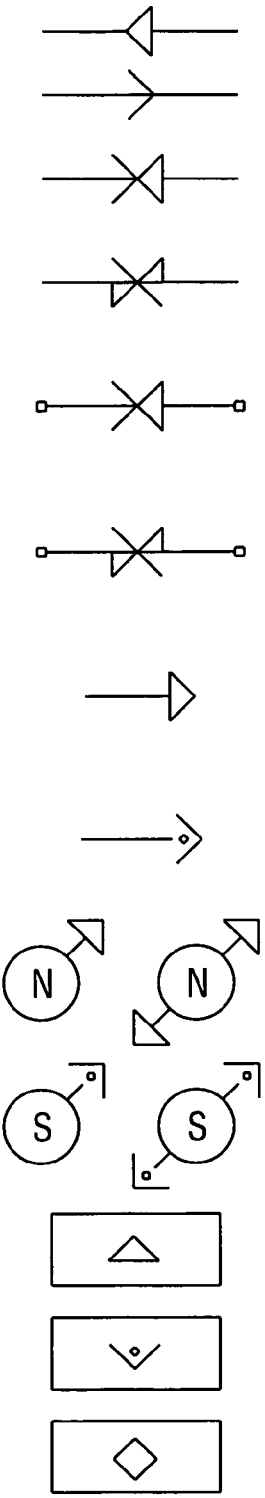

— The Graphic Code Sign for Positron;

— The Graphic Code Sign for Electrons;

— The Graphic Code Sign for Both Electron and Positron in a Given Wire or coil;

— The Graphic Code Sign for a Given Wire or Coil without Electric Current in;

— The Graphic Code Sign for a Solenoid or Electromagnet fed with Electric Energy, Lateral Representation;

— The graphic code sign for a solenoid or electromagnet unfed with electric energy, lateral representation;

— The Graphic Code Sign and Virtual Sense for North UMP as the North Unipolar Magnetic Particles;

— The Graphic Code Sign and Virtual Sense for South UMP as the South Unipolar Magnetic Particles;

— The Graphic Code Sign for North UMD as the North Unipolar Magnetic Domain and its Variants;

— The Graphic Code Sign for South UMD as the South Unipolar Magnetic Domain and its Variants;

— The Graphic Code Sign for an Activated Solenoid or the Electromagnet's North Pole Plan;

— The Graphic Code Sign for an Activated Solenoid or the Electromagnet's South Pole Plan;

— The Graphic Code Sign for an Unfed Solenoid or Electromagnet's Coil;

*FIG. 7*

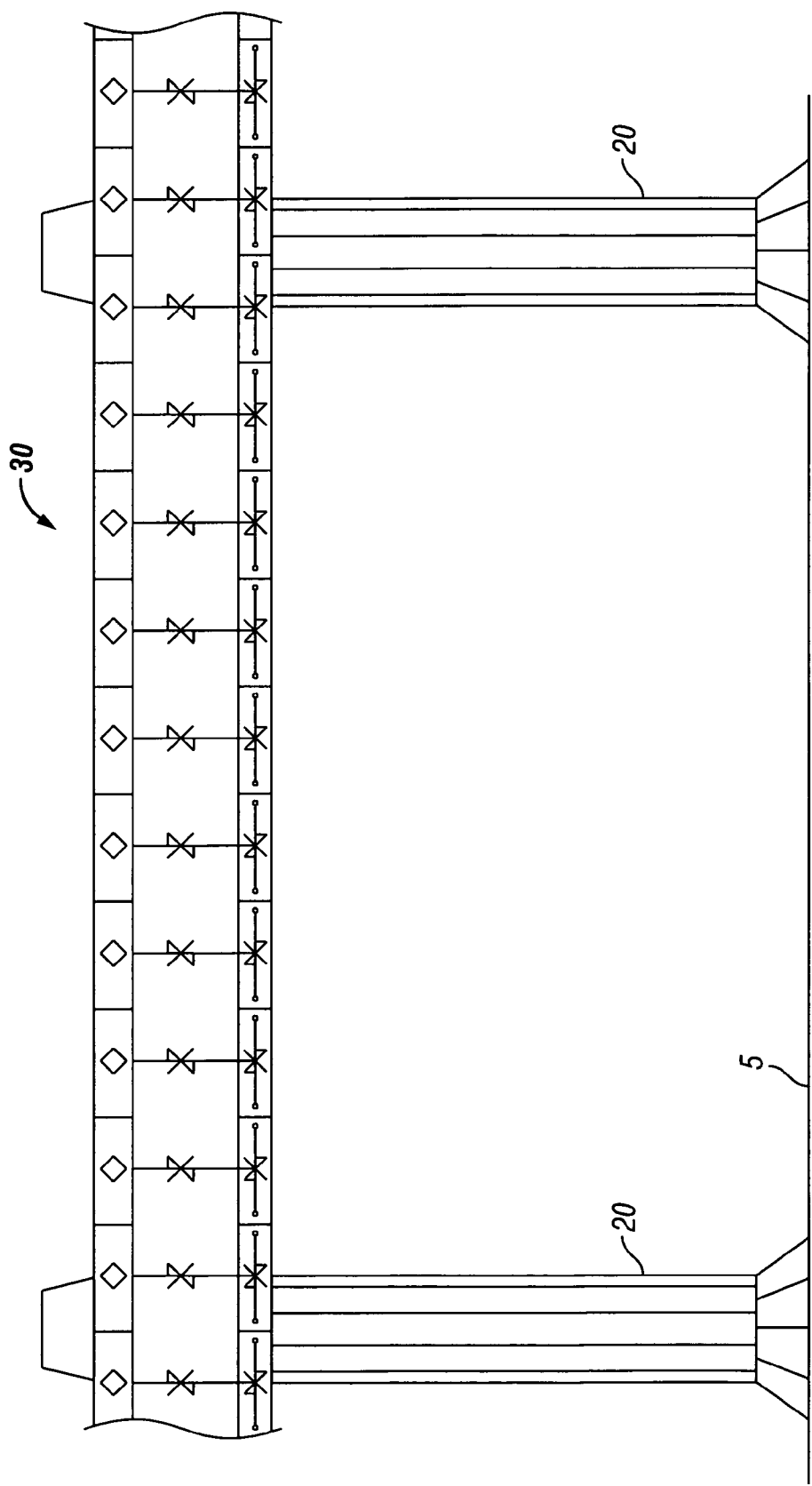

MAGNETICALLY LEVITATED TRANSPORT SYSTEM

CROSS-REFERENCE TO RELATED APPLICATIONS

This is a continuation-in-part application of U.S. patent application Ser. No. 11/209,916 filed Aug. 22, 2005 now abandoned, which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTTED ON A COMPACT DISC

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This disclosure relates generally to electric motor-generators and more particularly to to a DC linear electromagnetic machine operating by electrical induction.

2. Description of Related Art Including Information Disclosed Under 37 CFR 1.97 and 1.98

Tu et al, US 2004/0135452, discloses a flat rotary electric generator that includes at least one toroidal coil structure for cutting magnetic lines to induce a current and at least one disc-shaped magnetic pole structure oriented parallel to the helical coil structure. If multiple toroidal coil structures and disc-shaped magnetic coil structures are included, the toroidal coil structures and disc-shaped magnetic coil structures are arranged in alternating manner. The toroidal coil structure and disc-shaped magnetic pole structure are not provided with a permeable material. When either the toroidal coil structures or the at least one disc-shaped magnetic pole structure is rotated by an external force, the toroidal coil structure cuts the magnetic lines passing therethrough to generate an induced current. Neal, US 2002/0135263, discloses a plurality of stator arc segments that form a toroidal core for a stator assembly used to make a motor. In a preferred embodiment, a plurality of magnetic fields is created when electrical current is conducted through wire wound around poles on the toroidal core. A monolithic body of phase change material substantially encapsulates the conductors and holds the stator arc segments in contact with each other in the toroidal core. Hard disc drives using the motor, and methods of constructing the motor and hard disc drives are also disclosed. Rose, U.S. Pat. No. 6,803,691, discloses an electrical machine that comprises a magnetically permeable ring-shaped core centered on an axis of rotation and having two axially-opposite sides. Coils are wound toroidally about the core and disposed sequentially along the circumferential direction. Each coil includes two side legs extending radially alongside respectively sides of the core. Coil-free spaces exist between adjacent side legs. A bracket has first and second side flanges that are connected by a bridging structure and respectively abut the first and second sides of the coil. Mohler, U.S. Pat. No. 6,507,257, discloses a bi-directional latching actuator that is comprised of an output shaft with one or more rotors fixedly mounted thereon. The shaft and rotor are mounted for rotation in a magnetically conductive housing having a cylindrical coil mounted therein and is closed by conductive end caps. The end caps have stator pole pieces mounted thereon. In one embodiment, the rotor has at least two oppositely magnetized permanent magnets which are asymmetrically mounted, i.e., they are adjacent at one side and separated by a non-magnetic void on the other side. The stator pole piece has asymmetric flux conductivity and in one embodiment is axially thicker than the remaining portion of the pole piece. An abutment prevents the rotor from swinging to the neutral position (where the rotor magnets are axially aligned with the higher conductivity portion of the pole piece). Thus, the rotor is magnetically latched in one of two positions being drawn towards the neutral position. Energization of the coil with an opposite polarity current causes the rotor to rotate towards its opposite latching position whereupon it is magnetically latched in that position. Mohler, U.S. Pat. No. 5,337,030, discloses a permanent magnet brushless torque actuator that is comprised of an electromagnetic core capable of generating an elongated toroidally shaped magnet flux field when energized. Outside the generally cylindrical coil is an outer housing with upper and lower end plates at each end. Mounted to the end plates and extending towards each other are stator pole pieces separated from its opposing pole piece by an air gap. A permanent magnet rotor is disposed in the air gap and mounted on a shaft which in turn is rotatably mounted in each of the end plates. The permanent magnet rotor comprises at least two permanent magnets, each covering an arcuate portion of the rotor and having opposite polarities. Energization of the coil with current in one direction magnetizes the pole pieces such that each of the two pole pieces attracts one of the magnets of the rotor and repels the other magnet of the rotor resulting in a torque generated by the output shaft. Reversal of the current flow results in a reversal of the torque and rotation of the rotor in the opposite direction. Preferred embodiments are disclosed having multiple cells, i.e. a plurality of stator rotor stator combinations and/or cells in which there are a plurality of pole pieces at each stator pole plane. Kloosterhouse et al, U.S. Pat. No. 5,191,255, discloses an electromagnetic motor that includes a rotor having a plurality of magnets mounted along a perimeter of the rotor. Preferably, adjacent magnets have opposite poles facing outward. One or more electromagnets are disposed adjacent to the perimeter of the rotor so that as the rotor rotates, the magnets mounted on the rotor are carried near the poles of the electromagnets. Current is supplied to the electromagnets by a drive circuit in a predetermined phase relationship with the rotation of the rotor such that, for substantially all angular positions of the rotor, magnetic attraction and repulsion between the poles of the electromagnets and the magnets mounted on the rotor urge the rotor to rotate in a desired direction. Reflective material is mounted on the rotor in predetermined angular positions. The drive circuit includes a photosensitive device which produces a signal whose value varies according to whether the device is receiving light reflected from the reflective material. The signal is amplified to produce drive current for the electromagnets. Westley, U.S.

Pat. No. 4,623,809, discloses a stepper motor housing a pole structure in which a pair of identical stator plates, each having a plurality of poles, are positioned back to back with the poles projecting in opposite directions, the stator plates being positioned between a pair of substantially identical stator cups, each stator cup having a plurality of poles projecting inwardly from a back wall with a peripheral side wall terminating in an outwardly extending flange. A major surface of each flange is in contact with a face on one of the stator plates so as to assure a low reluctance magnetic path. Fawzy, U.S. Pat. No. 4,565,938, discloses an electromechanical device which can be used as a motor or as a generator. The device has a housing, including bearing means to support a rotatable shaft. Disc magnet means are provided, and poled to have alternating polarity and are mounted on the shaft to define a rotor. The device includes at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means are provided for electrical contact with the stator to draw off current when the device is operated as a generator, or provide current to operate the device as a motor. Fawzy, U.S. Pat. No. 4,459,501, discloses an electromechanical device which can be used as a motor or as a generator that has a housing, including bearing means to support a rotatable shaft. A pair of disc magnets are poled to have opposite polarity on the two faces of each. The magnets are mounted face to face together on the shaft to define a rotor. The device includes at least one first pole shoe in contact with one face of each magnet, and having a portion extending radially therefrom to define, in its preferred form, a pair of virtual pole chambers, of the same polarity as said one face. Also included is at least one second pole shoe in contact with the other face of each magnet and having a portion extending radially therefrom to define in its preferred form a pair of virtual pole chambers of the same polarity as the other face. A toroidal stator is mounted on the housing and has windings thereon. The stator is positioned annularly around the disc magnets such that the virtual pole chambers of the first and second pole shoes surround portions of said windings with circumferentially alternating fields of alternating polarity. Means for electrical contact with the stator draw off current when the device is operated as a generator, or provide current to operate the device as a motor.

The related art described above teaches linear motors and their uses. Such motors have been contemplated for use in transport systems. However, the prior art fails to disclose a transport system as defined in the detailed description and accompanying drawings. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The present invention is a magnetically levitated transport system for moving a suspended cargo such as passengers and freight. A linear motor uses a track stator about which a "rotor" moves linearly. Stator and rotor circuits interact electromagnetically to maintain a gap between the moving and fixed elements. Tractor coils are embedded within the track to produce thrust through electromotor action with magnets aboard the rotor. The rotor is configured in a triangular shape as is the track with opposing electromagnets positioned for creating mutual repulsion forces. A pulsed direct current in the stator circuit, derived from conventional alternating current taken from the power grid, is used to create an induced current in the rotor, which, in turn is used to energize rotor electromagnets.

A primary objective inherent in the above described apparatus and method of use is to provide advantages not taught by the prior art.

Another objective is to provide an electromagnetic linear machine which develops a linear propulsive force and levitation using electromagnetic induction.

A further objective is to provide such a machine useful as a transport system.

A further objective is to provide such a machine capable of recovering electrical energy upon braking.

A further objective is to provide such a machine capable of maintaining a desirable vehicle orientation about an axis in the direction of propulsion regardless of load imbalance or centripetal force vectors.

A further objective is to provide a linear operating machine capable of developing propulsion and braking forces without direct physical contact with an electrical current supply.

A further objective is to provide such a machine that is operated using energy supplied from an on-board power supply or an external power feed, or a combination of both.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIG. 7 is a table of symbols and their explanation used in FIGS. 8-10;

FIG. 8 is a side elevational view of the stator and its structural support shown with the symbols of FIG. 7;

DETAILED DESCRIPTION OF THE INVENTION

The above described drawing figures illustrate the present invention and its method of use in at least one of its preferred embodiments, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
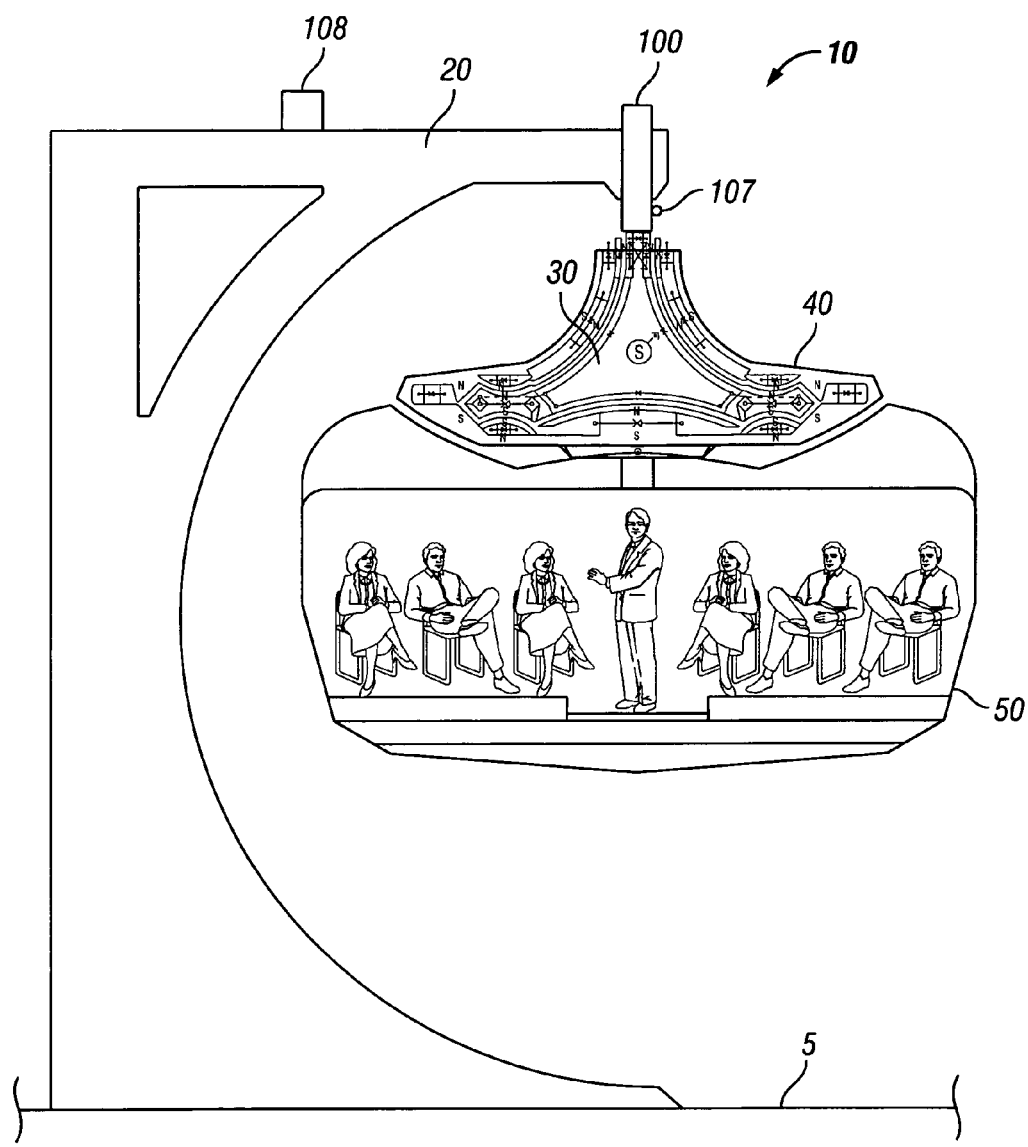
FIG. 1 is a conceptual diagram of the presently described apparatus shown as a frontal elevational sectional view.

Described now in detail is a magnetically levitated transport system 10. As shown in FIG. 1, the system comprises a plurality of rigid structural supports 20, an extensive linear track (also stator) 30, a rotor 40, and a gondola 50. The stator 30 and rotor 40 comprise a linear motor. The term "rotor" is used herein to refer to the moving member of the linear motor although it does not rotate, but rather moves linearly along the track 30. The supports 20 are spaced apart and secured at their respective lower ends to a surface 5 which is preferably similar to a typical railroad right-of-way, i.e., a stable and compact supporting surface. The track 30 is rigidly mounted to the lower ends of hangers 100 which depend downwardly from the supports 20 and which may be formed integrally with the track 30 as shown in FIG. 1. The term "track" is loosely applied to the non-moving member (stator) of the linear motor in that the present apparatus is designed to interface the rotor 40 only electromagnetically with track 30, and without physical contact except in an emergency. The rotor 40 is normally electromagnetically engaged with track 30, and is propelled along it by electromotive forces carrying its downwardly depending gondola 50 in a manner that is described in detail herein. Because there is normally no physical contact between rotor 40 and stator 30, no rotating wheels, and no friction forces, the rotor may achieve relatively high velocity in moving along track 30. Potentially, only the airodynamic drag forces developed in the spaces between rotor 40 and stator 30 are limiting.

The word "magnet(s)" is used herein to refer to, and alternatively has the meaning of (i) a simple permanent magnet(s), (ii) an electromagnet(s) with a permeable iron core (solenoid), and (iii) an electromagnet(s) with a permanent magnet core. Likewise, the term "magnetic" shall mean also "electromagnetic" herein.

Figure 2:
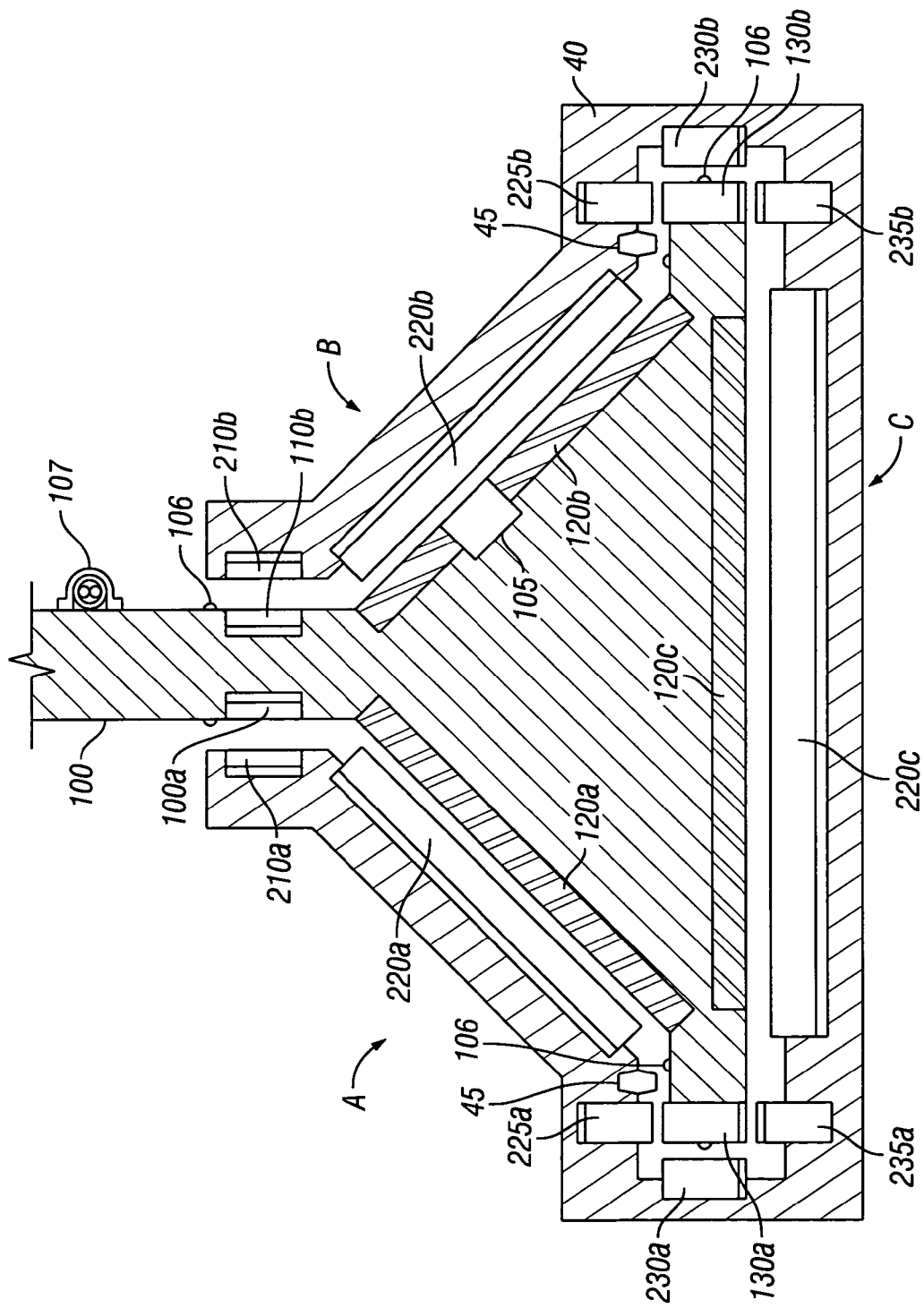
FIG. 2 is a vertical cross-sectional view of a linear motor thereof.

FIG. 2 is a mechanical schematic diagram showing graphically, but not necessarily in true proportion, a typical vertical cross-section of the track 30 as engaged with the rotor 40 and which together takes the general shape of a triangle with sides "A," "B" and "C" as illustrated. The letters "A," "B" and "C" are used with reference numbers in the notation to identify which of the three sides a specific element is position on. For instance "220A" and "220B" are identical elements located on the A side and the B side respectively. When no letter is shown, for example, "220", the reference is to all elements 220.

Figure 4:
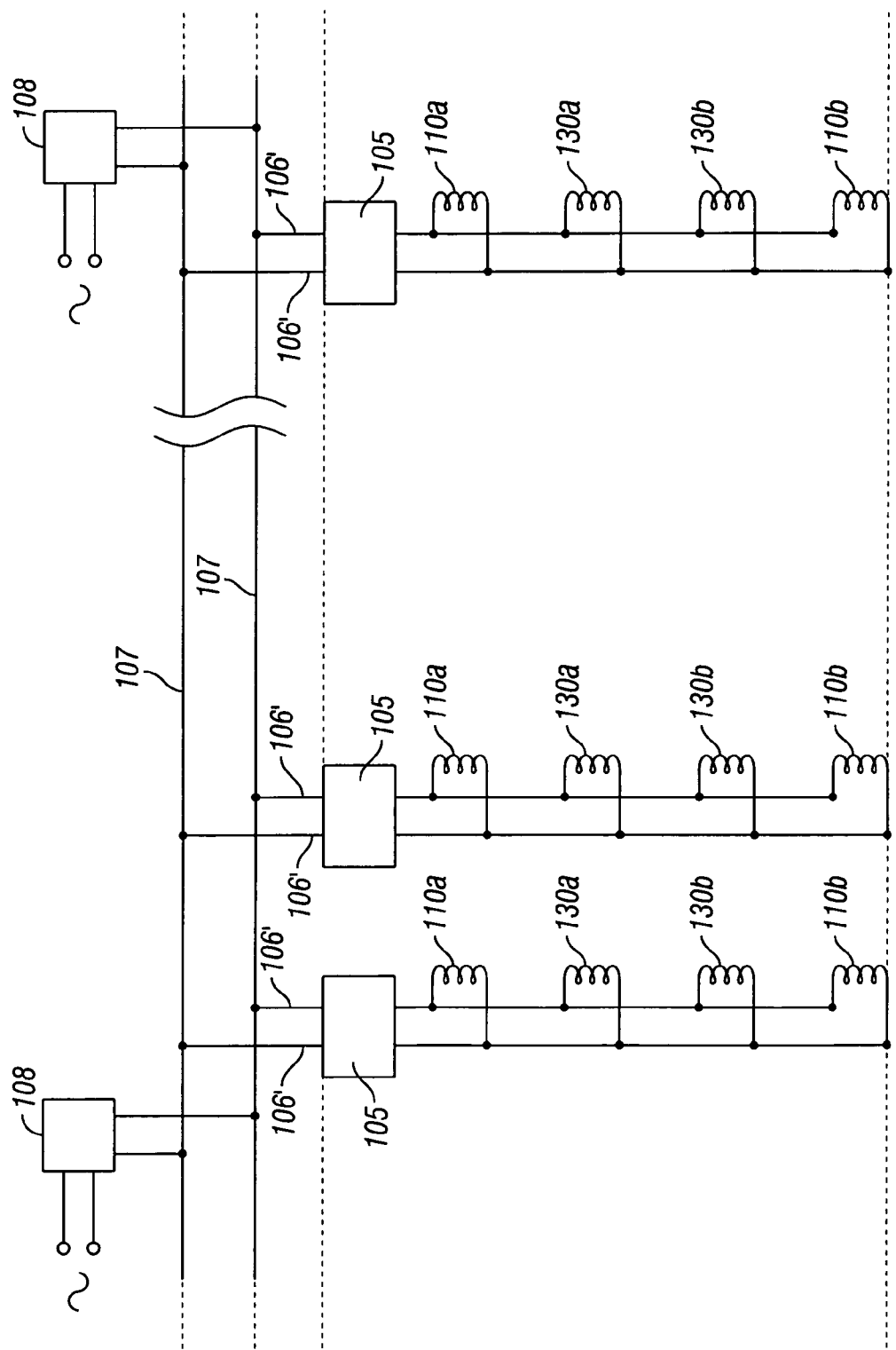
FIG. 4 is an electrical schematic diagram of the stator portion of the linear motor showing a preferred arrangement of levitation and stability solenoids thereof.

Referring further to FIG. 2, magnetic forces are used to maintain physical separation between track 30 and rotor 40, wherein, as part of the track 30, first magnet pairs 110 and 210 mutually repel each other, and second magnet pairs 130 and 230 also repel each other. Both the first and second magnet pairs assure lateral, or side-to-side separation between track 30 and rotor 40 during operation. Also, third magnet pairs 130 and 225 as well as fourth magnet pairs 130 and 235 provide mutual repulsion, and are positioned to assure vertical separation between track 30 and rotor 40 during operation. With all four of the aforsaid magnet pairs active, it is clear that the rotor 40 is able to maintain its spaced apart position relative to track 30, as the rotor moves along track 30. To accomplish this, the magnets 110 and 130 extend "continuously" along track 30 as shown conceptually in FIG. 6. In practice, magnets 110 and 130 preferably comprise a linear series of spaced apart individual magnets as shown in FIG. 4. Individual electrical control of the polarities of the magnet sets shown in FIG. 4 is necessary as will be explained below.

Figure 6:
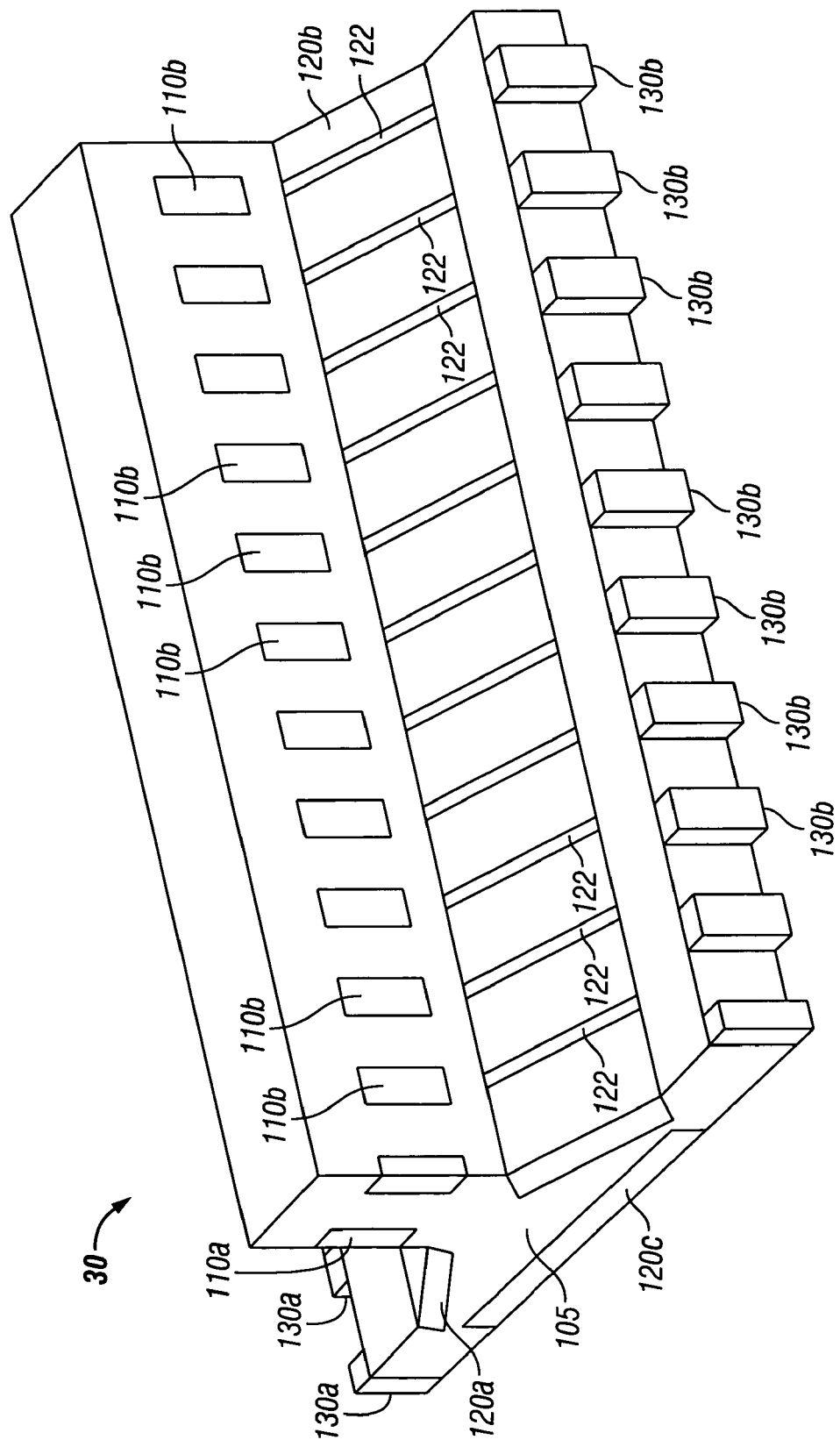
FIG. 6 is a conceptual perspective view of a length of the stator showing major elements thereof.

Magnets 220 which are mounted on rotor 40 are in positions that are aligned with slots 122 of sheet 120 (FIG. 6) an electrically permeable material. Tractor coils 106 (FIG. 3) are wound within slots 122. Sheets 120 are mounted in axial orientation along each side A, B and C of the track 30. Slots 122 may be rectangular or circular and are C-shaped in cross section with the opening facing outwardly toward rotor 40. Slots 122 are, as shown in FIG. 6 spaced apart along track 30 preferably in a uniformly repeating sequence but will necessarily be spaced closer on up-hill draws, and further apart on a down-grade. In their separate locations along track 30, each set of interconnected three tractor coils 106A, 106B and 106C are aligned in a vertical plane orthogonal to track 30 so that they interact electromagnetically with respective magnets 220 simultaneously as magnets 220 move past.

The magnets 110, 130, 210, 220, 225, 230, and 235 are perferably made up of a linear series of smaller magnets positioned in a side-by-side relationship and in one embodiment of the present invention where they are configured as electromagnets they may be wired in electrical series or in electrical parallel or series-parallel arrangements. Just as magnets 110 and 130 are fixedly mounted on track 30 extending axially, as previously described, magnets 210, 220, 225, and 235 are fixedly mounted on rotor 40 and also extend axially as linear arrangements of spaced apart individual magnets.

As with most mass-transit systems, the present invention may include one or more separate, or separatable cargo carrying cars or, as previously defined, gondolas 50. When more than one such gondola 50 is strung together to form a train, each gondola 50 will be engaged with one or more rotors 40, so that multiple rotors 40 will travel along stator 30 which acts as a conventional train track in supporting and directing the train, but also acts as an active electromagnetic component in propelling it.

Figure 3:
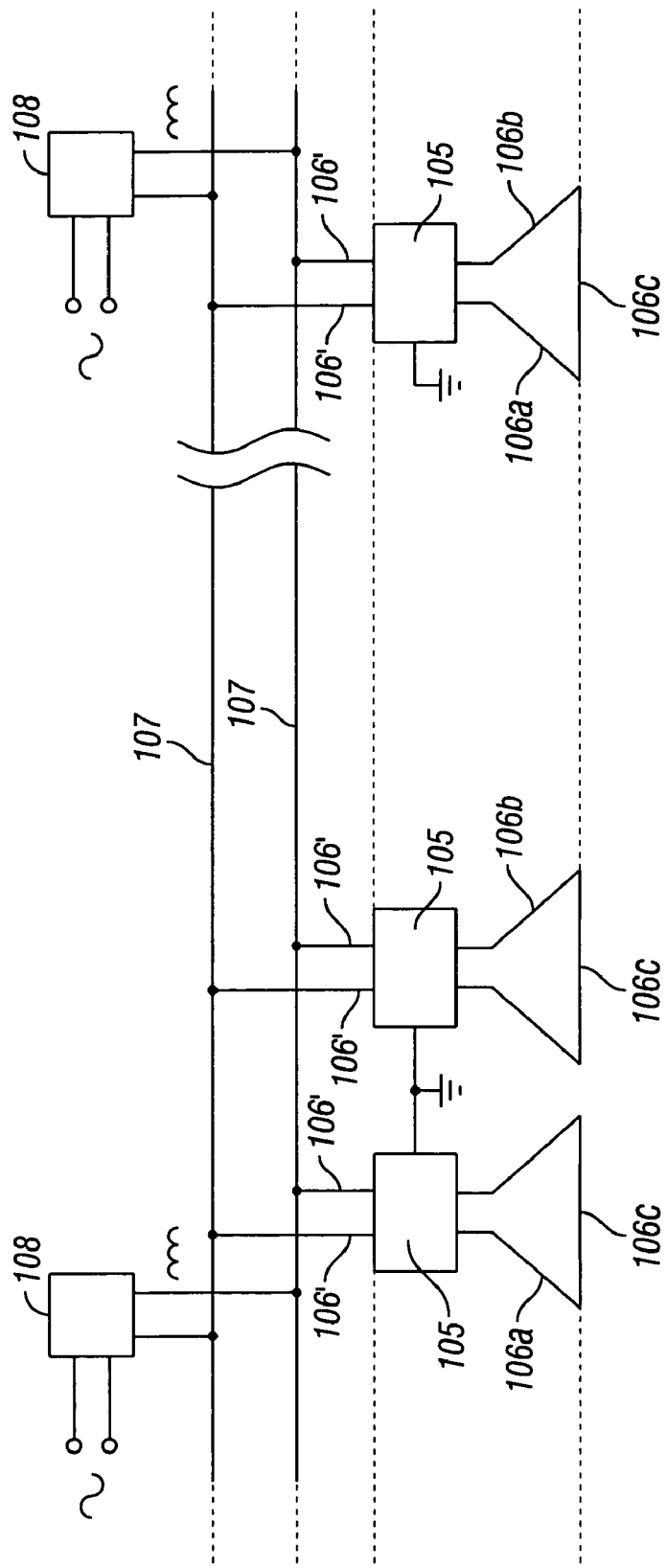
FIG. 3 is an electrical schematic diagram of a stator portion of the linear motor showing a preferred arrangement of traction windings thereof.

As shown in FIG. 3, an electrical schematic diagram of the tractor or propulsion elements of the track 30, electrical power is provided to the present apparatus generally as 60 Hz., three-phase, alternating current (AC). This AC is provided from existing power utilities found along the right of way, and may be carried in separate conduits (not shown) strung between and along the standoffs 20. At spaced apart locations, possibly miles apart, rectifiers 108, mounted on selected standoffs 20, receive the AC and provide full-wave rectification, referred to herein as pulsed DC (PDC), which is delivered to power lines 107 which are carried along track 30 from hanger 100 to hanger 100 (see FIG. 1).

PDC is taken off lines 107, as shown in FIG. 3, by tractor cables 106' and delivered to circuits 105 where hall sensors of circuits 105 direct switches of circuits 105 to establish the PDC as either a positive or a negative polarity with respect to a neutral or ground voltage reference. Circuits 105 are mounted on track 30 (FIG. 2); wherein PDC is delivered to the tractor coils 106 embedded in track 30 and routed through the slots 122 in the permeable material 120.

Figure 5:
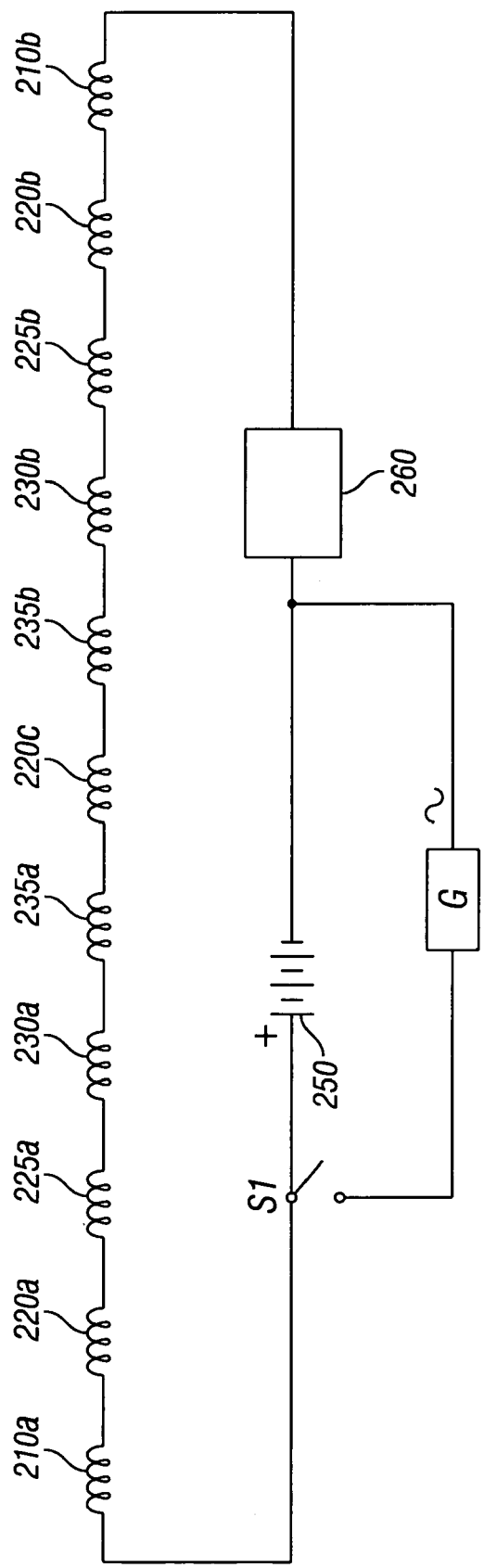
FIG. 5 is an electrical schematic diagram of the rotor portion of the linear motor showing a preferred arrangement of levitation, stability and traction solenoids thereof.

As shown in FIG. 5, preferably each set of magnets 210, 220, 225, 230 and 235 of rotor 40 may be configured as electromagnets. Because PDC carries a transient alternating current component, the transformer effect induces and AC current in the circuit of FIG. 5 and such induced current is rectified to a DC current in rectifier 260 and then stored in battery 250. Battery 250 is therefore always fully charged and provides a DC magnetization current to the magnets of rotor 40. As a backup source of power to the magnets of rotor 40, gasoline powered electrical generator is carried by rotor 40 and connected into the circuit of FIG. 5 when switch S1 closed.

The elements in FIGS. 3 and 5 are shown arranged in electrical series, however, those of skill in the art could arrange the elements in an electrical parallel circuit, or in a series-parallel circuit.

In an alternate embodiment, the electro-magnets 210, 220, 225, 230, 235 may be configured, as previously described, as simple permanent magnets. Operation of the invention is carried out in a similar manner as described above with the permanent magnets responding to the electromagnetic forces produced in the circuits of FIGS. 3 and 4.

The loading of gondola 50, and the dynamic inertial forces experienced by the rotor 40 during accelerations and on turns, may be best accommodated by the dynamic adjustment of magnetization current flow in the several magnet pairs which are used, as described above, for maintaining clearance gap between stator 30 and rotor 40. To accomplish this dynamic adjustment, proximity sensors 106 are used to sense the instantaneous gap in a feedback control circuit (not shown) to adjust the magnitude of current flow in magnets 110 and 130. Such variations in electromagnet repulsion forces may be required between magnet pairs 225/130 and 235/130 to accommodate gondola loading and on sudden vertical movements. Likewise, such variations in electromagnet repulsion forces may be required between magnet pairs 210/110 and 2305/130 to counter horizontal inertial forces on turns.

In a further alternate embodiment, represented by FIG. 2, the permanent magnets of the electromagnets of both the stator 30 and the rotor 40 may be replaced by cores of non-magnetized permeable ferro-iron materials well known in the electrical arts.

In the less complex operating mode, where the stator's magnets are solenoids, the stator circuit receives PDC, and, generates electromagnetic repulsion and traction forces with respect to the rotor's magnets, assuming they are only simple permanent magnets. When PDC failure occurs, the rotor sets down onto the stator supported by wheels 45 (FIG. 2). When the rotor's magnets are solenoids, normal operation maintains charge in battery 250 by induced current from the stator circuit and operation may continue even with failure of PDC from the stator, albeit at a relatively low level and also provide for braking for a safe stop.

Each of the individual stator circuits deriving power from each individual one of circuits 105 (hall sensors and switches) acts as a proximity sensors to identify the approach of each rotor circuit. Until a rotor circuit approaches the switch of circuit 105 places the respective stator circuit in short circuit status, which induces PDC in the short circuited stator circuit as the approaching rotor circuit passes; an equivalent operation to normal operation.

As the rotor circuit approaches each hall sensor it detects an approaching magnetic field pole and switches the polarity of the PDC to accommodate the linear electric motor function. As the rotor circuit leaves the proximity of each stator circuit, the hall sensor is immersed in the end effect of the magnetic field associated with magnets 220 of the rotor 40 and then switches the polarity of the PDC to eliminate the braking function, after which short circuit condition is restored until the next rotor circuit approaches.

Figure 9:
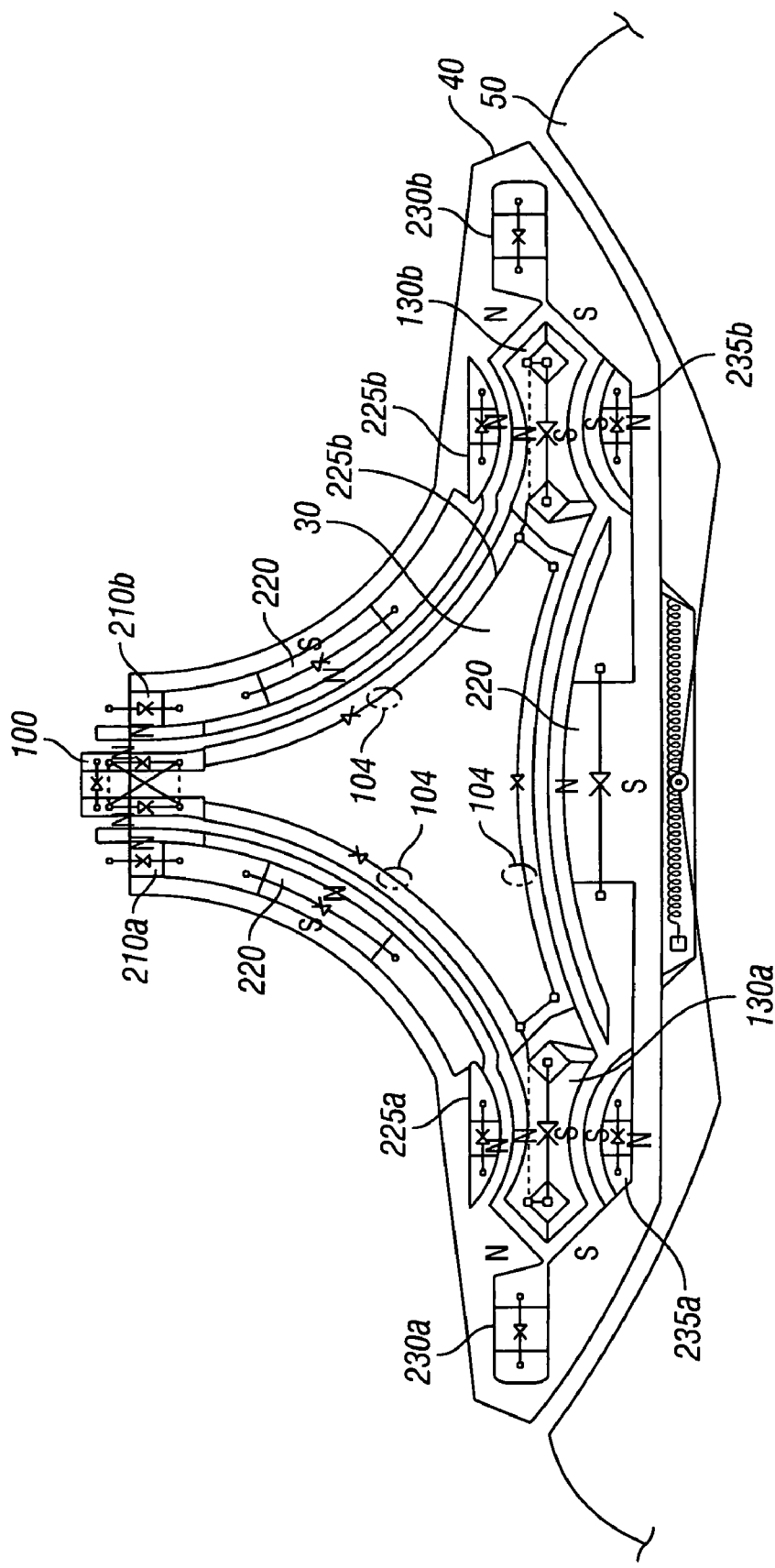
FIG. 9 is an electrical schematic shown as a vertical sectional view of the linear motor similar to FIG. 2 using the symbols of FIG. 7.
Figure 10:
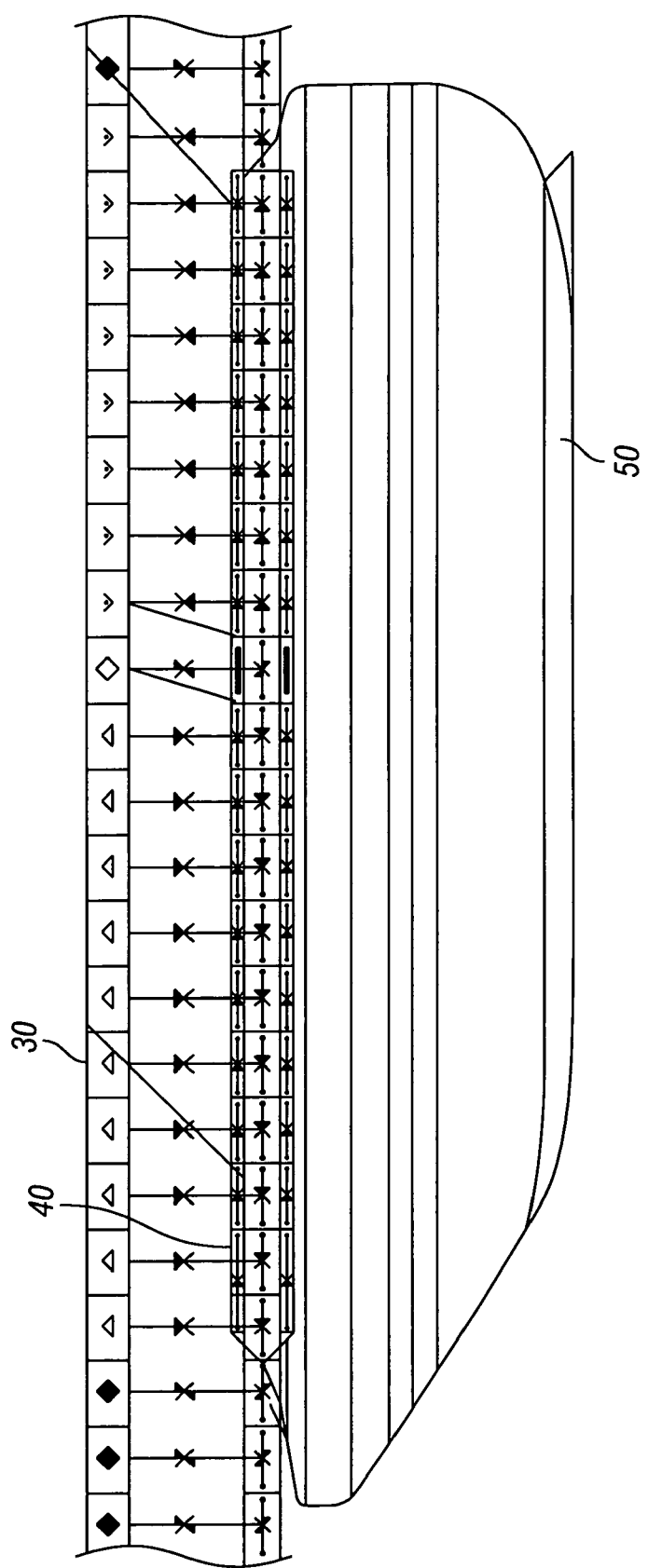
FIG. 10 is a side elevational view of the linear motor shown with a gondola of the invention using the symbols of FIG. 7 to illustrate the electrical interactions of stator and motor.

FIGS. 7-10 show electrical component placement and interactions between rotor and stator as described above, using the symbol set defined in FIG. 7.

In case of a power failure of the stator electrical system, the electrical generator 270 of the rotor electrical circuit shown in FIG. 5 is started up, switch S1 is closed and PDC is provided to the rotor circuit. In this case the PDC in inducted in coils 106, 110 and 130 of the stator, with the effect of maintaning rotor levitation, stability and thrust. If battery 250 fails, generator 270 is switched into the rotor circuit to energize its electromagnets. In case complete power failure occurs the rotor 40 will "fall" such that wheels 45 (FIG. 2) will touch down and roll on track 30 as shown in FIG. 2.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A magnetically levitated transport system comprising:
a linearly extensive stator, engaged with a linear rotor, the rotor adapted for moving along the stator axially by electromotive forces; the stator and the rotor each having a triangular shape with the stator positioned within the rotor and separated therefrom by a gap on three sides;
a plurality of spaced apart first sets of gap maintaining electromagnets engaged with the stator, the first sets axially spaced apart;
a plurality of spaced apart second sets of gap maintaining electromagnets engaged with the rotor, the second sets axially spaced apart in correspondance with the first sets;

the rotor positionable along the stator to bring the first sets and second sets of gap maintaining electromagnets into respective mutual proximity, thereby enabling magnetic repulsive forces between the sets of gap maintaining electromagnets to maintain said gap against gravitational and inertial forces on the rotor;

a plurality of spaced apart triangular sets of traction coils positioned on three sides of the stator;

a plurality of spaced apart triangular sets of traction electromagnets positioned on three sides of the rotor;

the rotor positionable along the stator to bring the sets of traction coils and the sets of traction electromagnets into respective mutual proximity, thereby enabling electromagnetic thrust forces between the sets of traction coils and traction electromagnets to move the rotor along the stator.

2. The magnetically levitated transport system of claim 1 further comprising a gondola suspended below the rotor, the gondola configured for carrying passengers and freight.

3. The magnetically levitated transport system of claim 1 further comprising at least one stator mounted full wave rectifier interconnected with a utility source of alternating current; the rectifier interconnected with and energizing the sets of traction coils for inducing an alternating current in each of the sets of traction electromagnets when in close proximity therewith as the rotor travels along the stator.

4. The magnetically levitated transport system of claim 3 further comprising axially oriented sheets of ferromagnetic material secured to the stator on three sides thereof, each of the sheets providing slot sets each comprising three slots oriented orthogonally to the stator axis, the slot sets axially spaced apart along the stator, and sized and adapted for receiving one of the sets of traction coils.

5. The magnetically levitated transport system of claim 3 wherein the full wave rectifier is interconnected with the sets of stator mounted gap maintaining electromagnets for inducing an alternating current in each of the sets of rotor mounted gap maintaining electromagnets when in close proximity therewith as the rotor travels along the stator.

6. The magnetically levitated transport system of claim 1 wherein each set of the rotor mounted gap maintaining electromagnets and each set of the associated rotor mounted traction electromagnets are in an electrical series circuit incluidng a storage battery.

7. The magnetically levitated transport system of claim 6 further comprising a rotor mounted full wave rectifier interconnected with the series circuit for charging the storage battery.

8. The magnetically levitated transport system of claim 6 further comprising a mechanically operated electrical generator with a full wave rectifier in electrical parallel with the series circuit for generating and delivering electrical energy to the storage battery and the electromagnets of the rotor circuit.

9. The magnetically levitated transport system of claim 1 further comprising an electromagnetic field sensing device and a polarity switch interconnected with each of the sets of traction coils and enabled for setting the sets of traction coils at short circuit prior to, and after, a set of traction electromagnets is sensed in proximity, and for then setting the sets of traction coils in a polarity for producing one of electromotive acceleration and electromotive deceleration.

10. The magnetically levitated transport system of claim 1 further comprising a proximity sensor positioned and adapted in a closed loop feedback circuit for sensing the gap and for adjusting current strength in the first sets of gap maintaining magnets to maintain a gap set point.

11. A magnetically levitated transport system comprising:

a linearly extensive stator, engaged with a linear rotor, the rotor adapted for moving along the stator axially by electromotive forces; the stator and the rotor each having a triangular shape with the stator positioned within the rotor and separated therefrom by a gap on three sides;

a plurality of spaced apart sets of gap maintaining electromagnets engaged with the stator, the first sets axially spaced apart;

a plurality of spaced apart sets of gap maintaining permanent magnets engaged with the rotor, the second sets axially spaced apart in correspondance with the first sets;

the rotor positionable along the stator to bring the electromagnets and permanent magnet sets into respective mutual proximity, thereby enabling magnetic repulsive forces between the sets of gap maintaining electromagnets and permanent magnets to maintain said gap against gravitational and inertial forces on the rotor;

a plurality of spaced apart triangular sets of traction coils positioned on three sides of the stator;

a plurality of spaced apart triangular sets of traction permanent magnets positioned on three sides of the rotor;

the rotor positionable along the stator to bring the sets of traction coils and the sets of traction permanent magnets into respective mutual proximity, thereby enabling magnetic thrust forces between the sets of traction coils and traction permanent magnets to move the rotor along the stator.

* * * * *